United States Patent
Onitake et al.

(10) Patent No.: US 9,897,187 B2
(45) Date of Patent: Feb. 20, 2018

(54) DIFFERENTIAL GEAR

(71) Applicant: JTEKT Corporation, Osaka-shi (JP)

(72) Inventors: Minoru Onitake, Kariya (JP);
Yasunori Kamitani, Fujimi (JP);
Motoyasu Yamamori, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/401,274

(22) Filed: Jan. 9, 2017

(65) Prior Publication Data

US 2017/0198801 A1 Jul. 13, 2017

(30) Foreign Application Priority Data

Jan. 13, 2016 (JP) .................................. 2016-004254

(51) Int. Cl.
| | | |
|---|---|---|
| *F16H 48/34* | (2012.01) | |
| *F16D 11/14* | (2006.01) | |
| *F16H 48/24* | (2006.01) | |
| *F16H 48/10* | (2012.01) | |
| *F16D 27/108* | (2006.01) | |

(52) U.S. Cl.
CPC ............. *F16H 48/34* (2013.01); *F16D 11/14* (2013.01); *F16D 27/108* (2013.01); *F16H 48/10* (2013.01); *F16H 48/24* (2013.01)

(58) Field of Classification Search
None
See application file for complete search history.

(56) References Cited

U.S. PATENT DOCUMENTS

| | | | | |
|---|---|---|---|---|
| 6,733,411 B1 * | 5/2004 | Kaplan | ................... | F16H 48/22 192/103 F |
| 2002/0077212 A1 * | 6/2002 | Krisher | .................... | F16H 48/22 475/231 |
| 2005/0070393 A1 * | 3/2005 | DeGowske | ............. | F16H 48/08 475/220 |
| 2007/0054771 A1 * | 3/2007 | Fusegi | .................... | F16H 48/08 475/231 |
| 2007/0142157 A1 * | 6/2007 | Nofzinger | ............... | F16H 48/08 475/231 |

(Continued)

FOREIGN PATENT DOCUMENTS

| | | |
|---|---|---|
| JP | 2003-322240 | 11/2003 |
| JP | 2008-95711 | 4/2008 |

(Continued)

*Primary Examiner* — Justin Holmes
(74) *Attorney, Agent, or Firm* — Oblon, McClelland, Maier & Neustadt, L.L.P.

(57) ABSTRACT

A differential gear includes: a first output gear; a second output gear; a differential case; a clutch member configured to move in a direction of a rotation axis between a connecting position where the differential case is connected to the first output gear in a relatively non-rotatable manner and a non-connecting position where the differential case and the first side gear are allowed to rotate relative to each other; an electromagnetic coil having a cylindrical shape and configured to move the clutch member in the direction of the rotation axis; and a yoke having an annular shape and serving as a magnetic path of a magnetic flux of the electromagnetic coil. The clutch member has an outermost diameter smaller than an inside diameter of the yoke.

7 Claims, 5 Drawing Sheets

(56) References Cited

U.S. PATENT DOCUMENTS

| | | | | |
|---|---|---|---|---|
| 2010/0179736 | A1* | 7/2010 | Johnson | F16H 48/30 |
| | | | | 701/51 |
| 2011/0105264 | A1* | 5/2011 | Maruyama | F16D 27/118 |
| | | | | 475/150 |
| 2014/0158493 | A1* | 6/2014 | Knoblauch | F16D 11/14 |
| | | | | 192/69.8 |
| 2014/0235397 | A1* | 8/2014 | McMillan | F16H 48/24 |
| | | | | 475/231 |

FOREIGN PATENT DOCUMENTS

| | | |
|---|---|---|
| JP | 2010-84930 | 4/2010 |
| JP | 2015-102185 | 6/2015 |

* cited by examiner

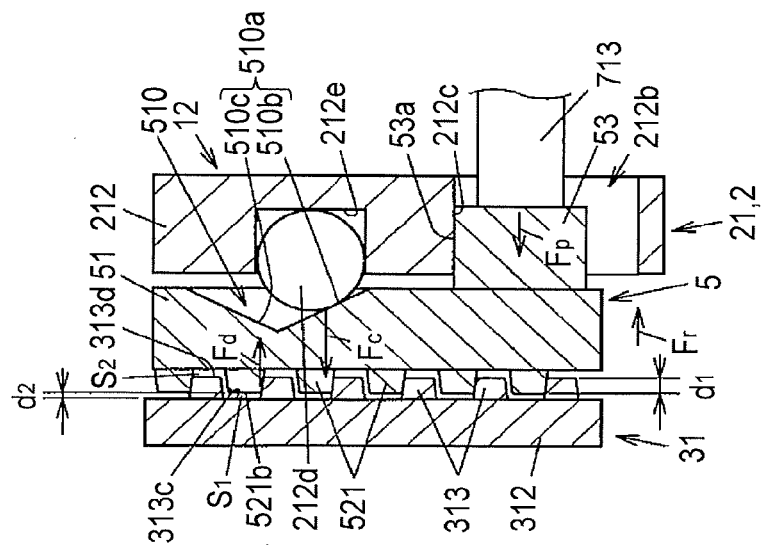
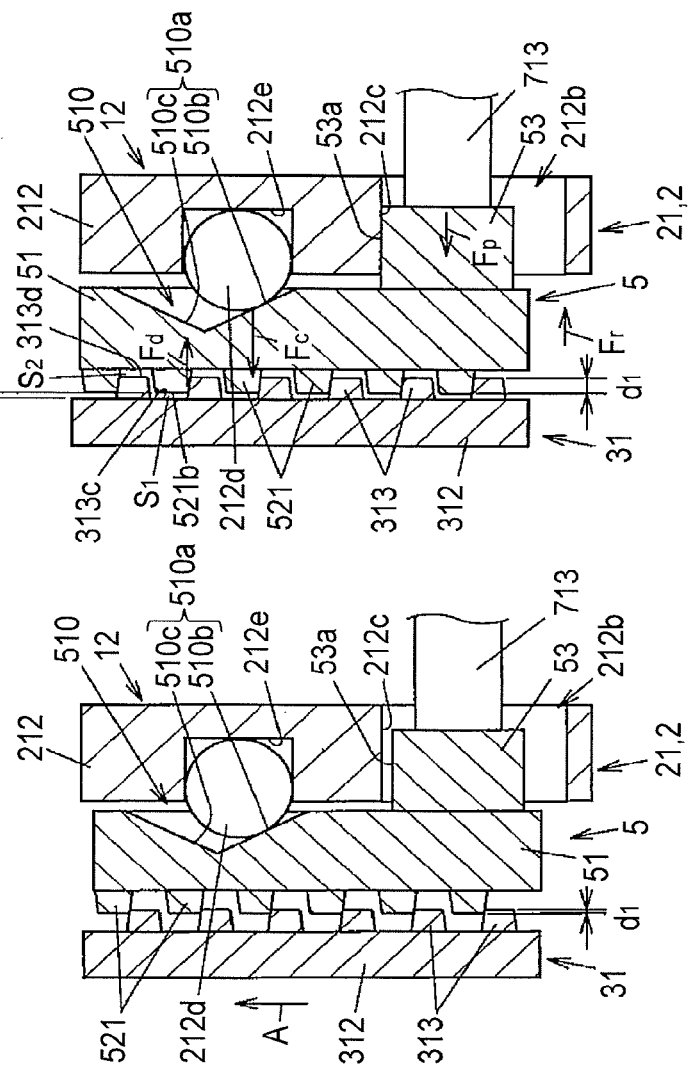
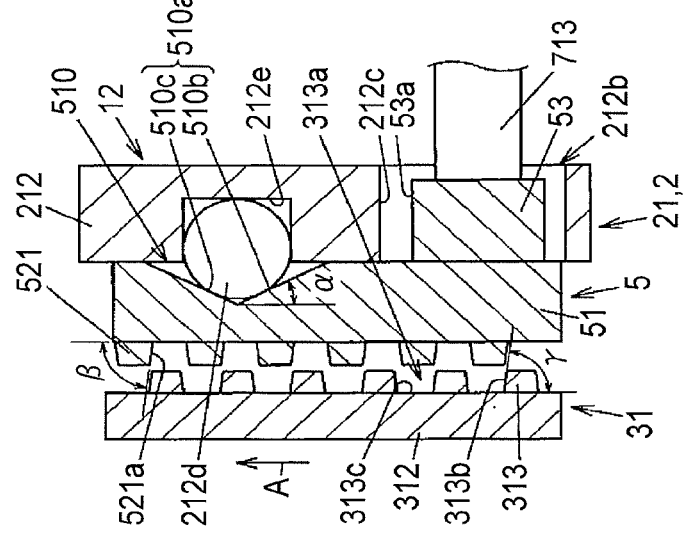

DIFFERENTIAL GEAR

INCORPORATION BY REFERENCE

The disclosure of Japanese Patent Application No. 2016-004254 filed on Jan. 13, 2016 including the specification, drawings and abstract is incorporated herein by reference in its entirety.

BACKGROUND OF THE INVENTION

1. Field of the Invention

The present invention relates to a differential gear for distributing a driving force input into a differential case to a pair of output gears while a differential action therebetween is allowed.

2. Description of Related Art

As a differential device (a differential gear) for distributing a driving force to right and left wheels of a vehicle while a differential action therebetween is allowed, there is such a differential device including a differential lock mechanism that restricts a differential action between a pair of output gears (for example, see Japanese Patent Application Publication No. 2010-84930 (JP 2010-84930 A), Japanese Patent Application Publication No. 2015-102185 (JP 2015-102185 A)).

A differential device described in JP 2010-84930 A includes: a differential case; a pair of pinion gears pivotally supported by a pinion shaft fixed to the differential case; a pair of side gears (output gears) that mesh with the pair of pinion gears with their gear axes being at right angles; an intermittent member placed in an axially movable manner while engaging, in a rotation direction, with a hole portion provided in the differential case; and an actuator for axially moving the intermittent member.

The intermittent member has meshing teeth configured to mesh with one side gear out of the pair of side gears. The actuator includes an electromagnet and a moving member that axially moves by a magnetic force of the electromagnet. The electromagnet is constituted by an electromagnetic coil and a core placed so as to surround the electromagnetic coil. The moving member is constituted by a plunger made of a magnetic material, and a ring made of a nonmagnetic material that prevents a magnetic flux of the electromagnet from leaking out to the differential case. The moving member is placed inside the electromagnet, and the electromagnet and the intermittent member are axially arranged side by side.

When a current is applied to the electromagnet, the plunger moves toward an intermittent-member side, so that a ring presses the intermittent member via a plate fixed to the intermittent member. The intermittent member receives a pressing force at this time so as to move axially and mesh with the pair of side gears. This restricts a relative rotation between the differential case and one side gear, and along with this, a differential rotation between the pair of side gears is also restricted.

Similarly to the differential device described in JP 2010-84930 A, a differential device described in JP 2015-102185 A includes an intermittent member, and an actuator including an electromagnet and a moving member, and the moving member is constituted by a plunger and a ring. One axial end surface of the electromagnetic coil is opposed to a differential case, and the axial end surface is not covered with a core. When a current is applied to the electromagnet, a magnetic flux is generated in a magnetic path including the differential case, so that the plunger axially moves together with the ring by this magnetic flux. The intermittent member is pressed by the ring so as to mesh with one side gear, thereby restricting a relative rotation between the differential case and the pair of side gears.

SUMMARY OF THE INVENTION

In the differential device described in JP 2010-84930 A, the moving member is placed inside the electromagnet so as to achieve downsizing in an axial direction. In the differential device described in JP 2015-102185 A, the differential case is provided in the magnetic path, so as to achieve further downsizing in the axial direction. However, depending on a layout of in-vehicle devices such as an engine and an accessory, further more downsizing may be requested.

The present invention provides a differential gear that achieves downsizing particularly in an axial direction.

A differential gear according to an aspect of the invention includes: a first output gear; a second output gear placed rotatable relative to the first output gear around a common rotation axis; a differential case configured to store the first output gear and the second output gear; a clutch member configured to move in a direction of the rotation axis between a connecting position where the differential case is connected to the first output gear in a relatively non-rotatable manner and a non-connecting position where the differential case and the first side gear are allowed to rotate relative to each other; an electromagnetic coil having a cylindrical shape and configured to move the clutch member in the direction of the rotation axis by a magnetic force generated by current application; and a yoke having an annular shape and serving as a magnetic path of a magnetic flux of the electromagnetic coil. The clutch member has an outermost diameter smaller than an inside diameter of the yoke.

According to the aspect, it is possible to achieve downsizing in an axial direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5A is an explanatory view schematically illustrating an operation of a cam mechanism;

FIG. 5B is an explanatory view schematically illustrating the operation of the cam mechanism; and FIG. 5C is an explanatory view schematically illustrating the operation of the cam mechanism.

DETAILED DESCRIPTION OF EMBODIMENTS

An embodiment of the present invention will be described with reference to FIGS. 1 to 5C. Note that the embodiment described below shows one preferred concrete example on performing the present invention. There are some parts that specifically exemplify various technical matters that are technically preferable, but the technical scope of the present invention is not limited to such concrete examples.

Figure 1:
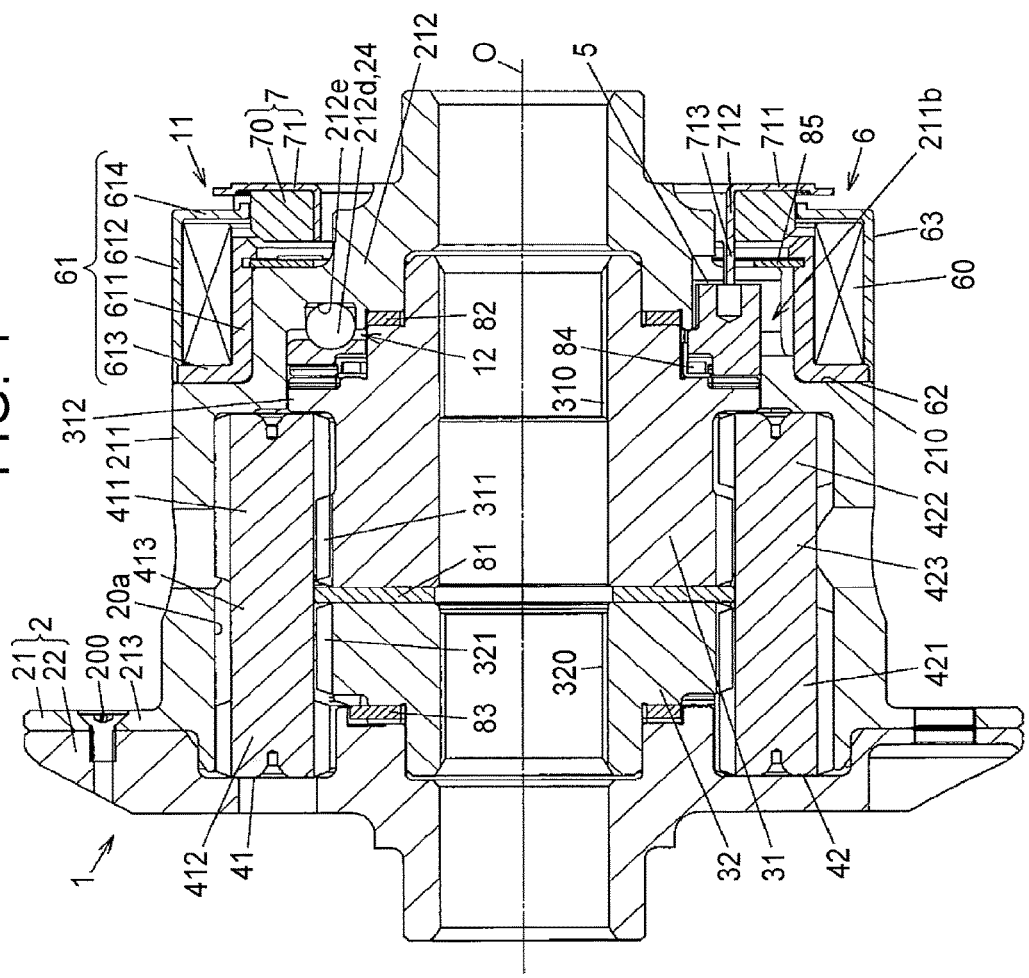
FIG. 1 is a sectional view illustrating an exemplary configuration of a differential gear according to an embodiment of the present invention.
Figure 2:
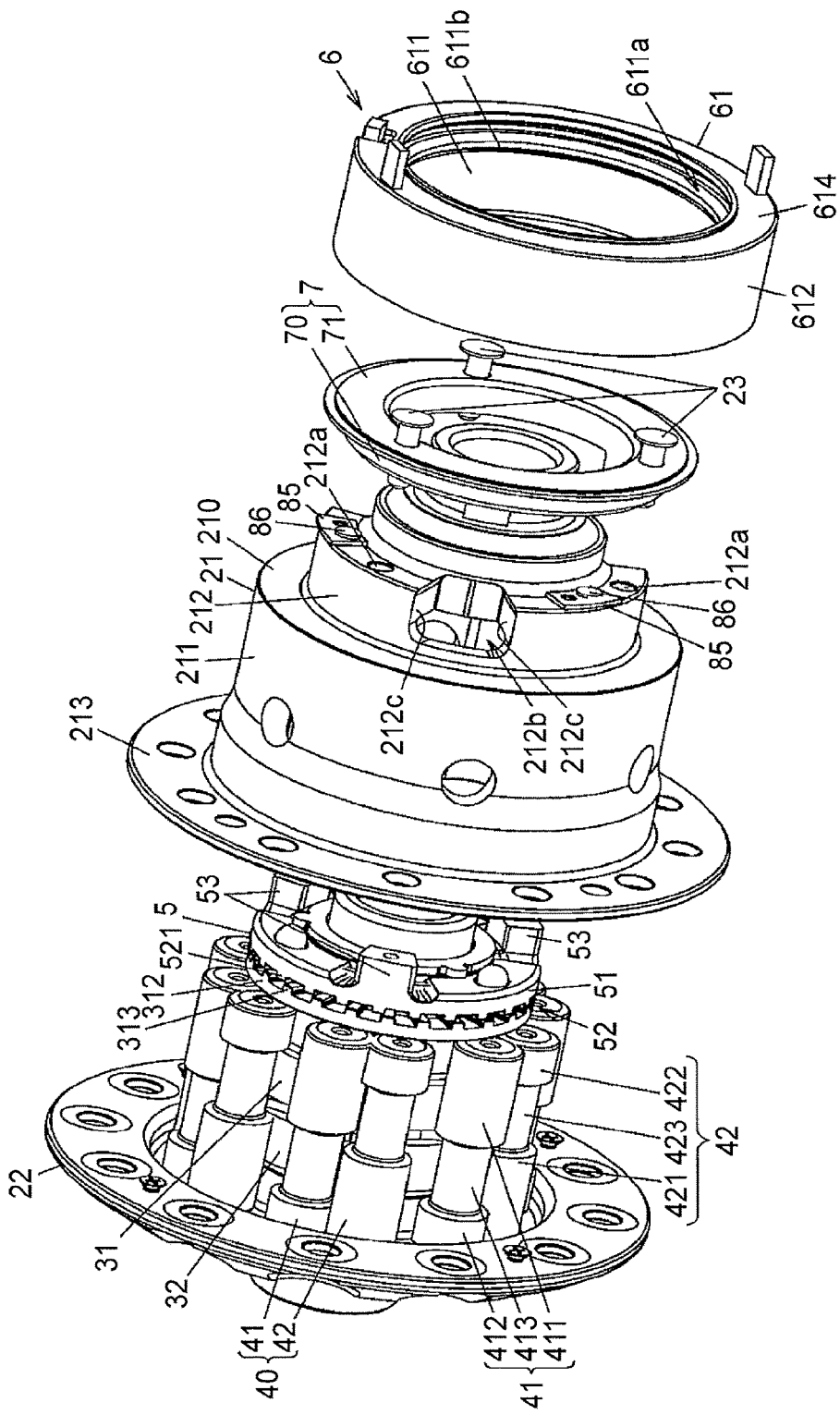
FIG. 2 is an exploded perspective view of the differential gear.
Figure 3B:
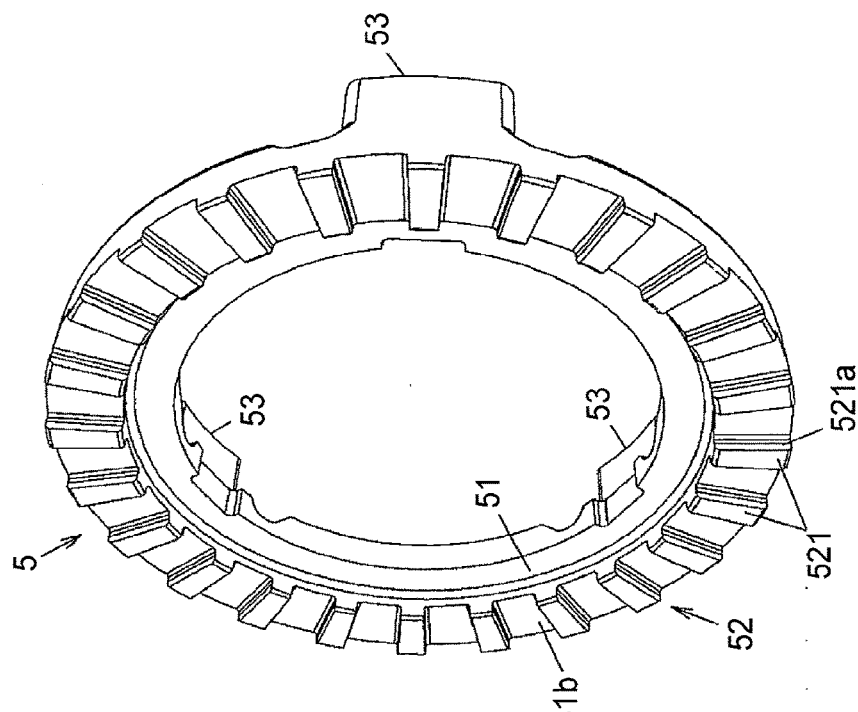
FIG. 3B is a perspective view of the clutch member constituting the pressing mechanism of the differential gear.
Figure 3A:
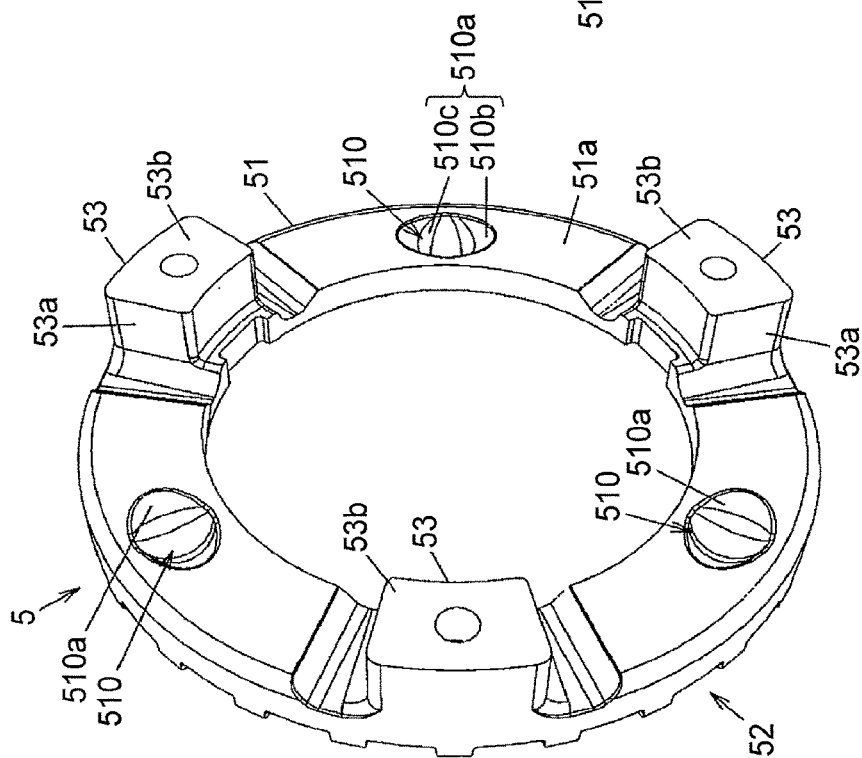
FIG. 3A is a perspective view of a clutch member constituting a pressing mechanism of the differential gear.
Figure 4A:
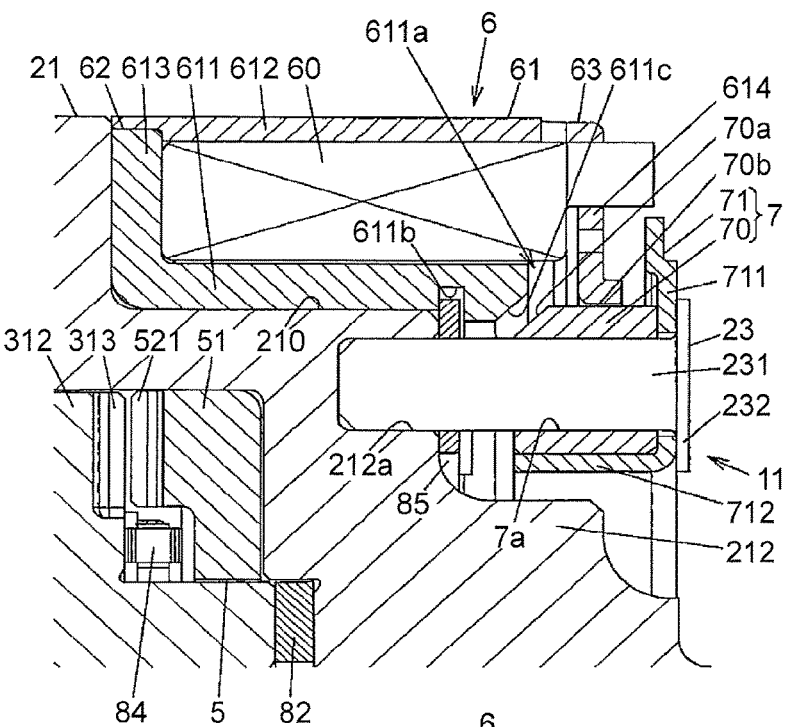
FIG. 4A is a sectional view illustrating a part of the differential gear in an enlarged manner.
Figure 4B:
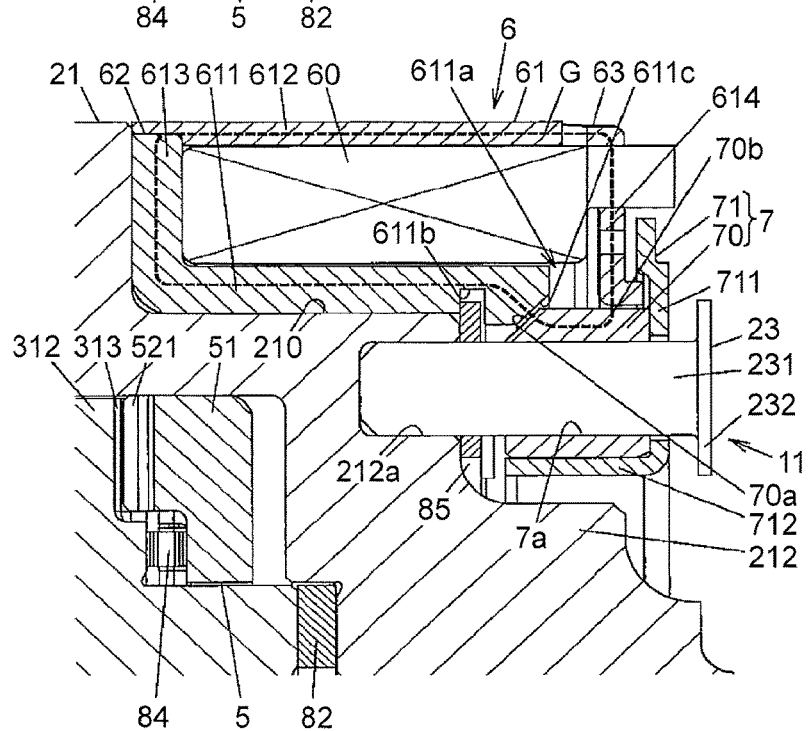
FIG. 4B is a sectional view illustrating a part of the differential gear in an enlarged manner.

FIG. 1 is a sectional view illustrating an exemplary configuration of a differential gear according to the embodiment of the present invention. FIG. 2 is an exploded perspective view of the differential gear. FIGS. 3A and 3B are perspective views of a clutch member constituting a pressing mechanism of the differential gear. FIGS. 4A and 4B are sectional views each illustrating a part of the differential gear in an enlarged manner.

The differential gear 1 is used to distribute a driving force of a drive source for a vehicle while a differential action between a pair of output shafts is allowed. The drive source is constituted by an engine or an electric motor. More specifically, the differential gear 1 according to the present embodiment is used as a differential device for distributing a driving force of the drive source to right and left wheels, for example, and distributes the driving force input therein to right and left drive shafts as the pair of output shafts. Note that, in the following description, a right side and a left side of FIG. 1 may be just referred to as the "right side" and the "left side" for convenience, but the "right side" and the "left side" herein do not necessarily limit right and left in a vehicle width direction in a state where the differential gear is provided in the vehicle.

The differential gear 1 includes: a differential case 2; a first side gear 31 and a second side gear 32 stored in the differential case 2; a plurality of (five in the present embodiment) of pinion gear sets 40 each configured such that a first pinion gear 41 and a second pinion gear 42 are meshed with each other; a clutch member 5 that can transmit a torque between the differential case 2 and the first side gear 31; and a pressing mechanism 11 for giving a pushing pressure to the clutch member 5.

The first side gear 31 is placed on the right side and the second side gear 32 is placed on the left side. The first side gear 31 and the second side gear 32 have a cylindrical shape. A spline portion 310 to which one output shaft is connected in a relatively non-rotatable manner is provided on an inner peripheral surface of the first side gear 31, and a spline portion 320 to which the other output shaft is connected in a relatively non-rotatable manner is provided on an inner peripheral surface of the second side gear 32.

The differential case 2, the first side gear 31, and the second side gear 32 are placed rotatable relative to each other around a common rotation axis O. Hereinafter, a direction parallel to the rotation axis O is referred to as an axial direction.

The differential case 2 functions as an input rotational member into which the driving force of the drive source is input, and the first side gear 31 and the second side gear 32 function as a first output gear and a second output gear, respectively. A plurality of holding holes 20 for rotatably holding the first pinion gear 41 and the second pinion gear 42 of each pinion gear set 40 is provided in the differential case 2. The first pinion gear 41 and the second pinion gear 42 revolve around the rotation axis O and are rotatable in corresponding holding holes 20 with their respective central axes being taken as their rotation axes.

The first side gear 31 and the second side gear 32 have a common outside diameter, and gear wheel portions 311, 321 constituted by a plurality of helical teeth are provided on respective outer peripheral surfaces. A center washer 81 is placed between the first side gear 31 and the second side gear 32. Further, a side washer 82 is placed on the right side of the first side gear 31, and a side washer 83 is placed on the left side of the second side gear 32.

The first pinion gear 41 integrally includes a long gear wheel portion 411, a short gear wheel portion 412, and a connection portion 413 for connecting the long gear wheel portion 411 with the short gear wheel portion 412 in the axial direction. Similarly, the second pinion gear 42 integrally includes a long gear wheel portion 421, a short gear wheel portion 422, and a connection portion 423 for connecting the long gear wheel portion 421 with the short gear wheel portion 422 in the axial direction.

The first pinion gear 41 is configured such that: the long gear wheel portion 411 meshes with the gear wheel portion 311 of the first side gear 31 and the short gear wheel portion 422 of the second pinion gear 42; and the short gear wheel portion 412 meshes with the long gear wheel portion 421 of the second pinion gear 42. The second pinion gear 42 is configured such that: the long gear wheel portion 421 meshes with the gear wheel portion 321 of the second side gear 32 and the short gear wheel portion 412 of the first pinion gear 41; and the short gear wheel portion 422 meshes with the long gear wheel portion 411 of the first pinion gear 41. Note that FIG. 2 does not illustrate the helical teeth of these gear wheel portions.

In a case where the first side gear 31 and the second side gear 32 rotate at the same speed, the first pinion gear 41 and the second pinion gear 42 revolve together with the differential case 2 without rotating in respective holding holes 20. Further, in a case where the first side gear 31 and the second side gear 32 have different rotation speeds at the time of turning or the like of the vehicle, for example, the first pinion gear 41 and the second pinion gear 42 revolve while rotating in the respective holding holes 20. Hereby, a driving force input into the differential case 2 is distributed while a differential action between the first side gear 31 and the second side gear 32 is allowed.

The clutch member 5 moves in the axial direction between a connecting position where the differential case 2 is connected to the first side gear 31 in a relatively non-rotatable manner and a non-connecting position where the differential case 2 and the first side gear 31 are allowed to rotate relative to each other. FIG. 4A illustrates a state where the clutch member 5 is placed at the non-connecting position, and FIG. 4B illustrates a state where the clutch member 5 is placed at the connecting position.

When the clutch member 5 is placed at the connecting position, a differential action between the differential case 2 and the first side gear 31 is restricted, so that the first pinion gear 41 and the second pinion gear 42 cannot rotate and a differential action between the differential case 2 and the second side gear 32 is also restricted. The clutch member 5 is biased toward the non-connecting position by a return spring 84 placed between the clutch member 5 and the first side gear 31.

The pressing mechanism 11 includes an electromagnet 6 for generating an electro-magnetic force, and a plunger 7 moving in the axial direction by a magnetic force of the electromagnet 6 so as to press and move the clutch member 5 in the axial direction. The electromagnet 6 includes a cylindrical electromagnetic coil 60, and a yoke 61 serving as a magnetic path of a magnetic flux generated by current application to the electromagnetic coil 60. The electromagnetic coil 60 generates a magnetic force to axially move the clutch member 5 by current application.

The yoke 61 includes: an inner ring portion 611 opposed to an inner peripheral surface of the electromagnetic coil 60;

an outer ring portion 612 opposed to an outer peripheral surface of the electromagnetic coil 60; and first and second axial end portions 613, 614 opposed to respective axial end surfaces of the electromagnetic coil 60. The first axial end portion 613 is opposed to a left end portion of the electromagnetic coil 60, and the second axial end portion 614 is opposed to a right end portion of the electromagnetic coil 60. In the present embodiment, the yoke 61 is constituted by an inner member 62 having the inner ring portion 611 and the first axial end portion 613, and an outer member 63 having the outer ring portion 612 and the second axial end portion 614. The inner member 62 and the outer member 63 are integrated by welding.

A discontinuous portion 611a where the magnetic path of the magnetic flux of the electromagnetic coil 60 becomes discontinuous is provided in the inner ring portion 611 of the yoke 61 along a circumferential direction. In the present embodiment, an axial length of the inner ring portion 611 of the yoke 61 is shorter than an axial length of the outer ring portion 612, and a gap provided between an axial end portion of the inner ring portion 611 and the second axial end portion 614 serves as the discontinuous portion 611a.

Further, a cut 611b provided in a radial direction is provided on an inner peripheral surface of the inner ring portion 611 on a first-axial-end-portion-613 side relative to the discontinuous portion 611a. Outer peripheral ends of a plurality of (three in the present embodiment mode) fan-shaped fixing plates 85 made of a nonmagnetic material are fitted to the cut 611b. In FIG. 2, two fixing plates 85 among them are illustrated. The fixing plate 85 is fixed to the differential case 2 by a pin 86. An axial position of the yoke 61 relative to the differential case 2 is fixed such that the fixing plates 85 are fitted to the cut 611b.

The plunger 7 includes an annular magnetic material core 70 made of a soft magnetic material, and a pressing member 71 made of a nonmagnetic material and configured to move in the axial direction integrally with the magnetic material core 70 so as to press the clutch member 5. The magnetic material core 70 is axially opposed to at least one end portion out of both end portions of the yoke 61 across the discontinuous portion 611a. In the present embodiment, part of an outer peripheral side of the magnetic material core 70 is axially opposed to an end portion of the inner ring portion 611 of the yoke 61 on a second-axial-end-portion-614 side.

More specifically, an inclined surface 70a inclined relative to the axial direction is provided in a part of the outer peripheral side of the left end portion of the magnetic material core 70, and an inclined surface 611c inclined relative to the axial direction so as to be parallel to the inclined surface 70a of the magnetic material core 70 is provided in an axial end portion of the inner ring portion 611 of the yoke 61 on a discontinuous-portion-611a side. The inclined surface 70a of the magnetic material core 70 is axially opposed to the inclined surface 611c of the inner ring portion 611 of the yoke 61. Further, the outer peripheral surface 70b of the magnetic material core 70 is opposed to an end portion of the second axial end portion 614 of the yoke 61 on the inner peripheral side.

The pressing member 71 includes: an annular plate portion 711 opposed to an axial end surface of the magnetic material core 70; a cylindrical plate portion 712 opposed to an inner peripheral surface of the magnetic material core 70; and a plurality of (three in the present embodiment) extending portions 713 axially extended from the cylindrical plate portion 712 and abutting with axial end surfaces (distal surfaces 53b of the after-mentioned engageable portions 53) of the clutch member 5 so as to press the clutch member 5.

The differential case 2 includes: a first case member 21 and a second case member 22 fixed to each other by a plurality of screws 200; and a plurality of (three in the present invention) pillar-shaped guide members 23 fixed to the first case member 21 so as to axially guide the plunger 7. The plunger 7 is movable in the axial direction relative to the differential case 2 by being guided by the guide members 23.

The guide member 23 is a nonmagnetic material made of austenitic stainless steel or aluminum, for example, and integrally includes a columnar shaft portion 231 and a falling-off prevention portion 232 provided in one end of the shaft portion 231, as illustrated in FIGS. 4A and 4B. Insertion holes 7a through which the shaft portions 231 of the guide members 23 are passed are provided at a plurality of (three in the present embodiment) places in the plunger 7. The insertion holes 7a extend in the axial direction so as to axially penetrate through the magnetic material core 70 and the pressing member 71.

The shaft portion 231 of the guide member 23 has an outside diameter slightly smaller than an inside diameter of the insertion hole 7a of the plunger 7, and a longitudinal direction along its central axis is parallel to the rotation axis O. The falling-off prevention portion 232 has a discoid shape having an outside diameter larger than the inside diameter of the insertion hole 7a of the plunger 7, and abuts with an end of the plunger 7 on an opposite side to the clutch member 5 so as to prevent the plunger 7 from falling off. The guide member 23 is an example of "columnar member" of the present invention.

The first case member 21 integrally includes: a cylindrical portion 211 having a cylindrical shape and holding the plurality of pinion gear sets 40 rotatably; a bottom portion 212 extending inwardly from one end of the cylindrical portion 211; and a flange portion 213 butted against the second case member 22. An annular recess 210 to which the electromagnet 6 is mounted is provided at a corner between the cylindrical portion 211 and the bottom portion 212.

The first side gear 31 and the second side gear 32 are placed inside the cylindrical portion 211. Further, the first case member 21 is made of metal having a magnetic permeability lower than the yoke 61, and a ring gear (not shown) is fixed to the flange portion 213. The differential case 2 rotates around the rotation axis O by the driving force transmitted from the ring gear. The ring gear is mounted to the differential case 2 from a bottom-portion-212 side of the first case member 21. At this time, the electromagnet 6 is stored in the annular recess 210, and an outside diameter of the electromagnet 6 is equal to an outside diameter of the cylindrical portion 211 of the first case member 21, so the ring gear can be mounted with the electromagnet 6 being fixed.

As illustrated in FIG. 2, in the bottom portion 212 of the first case member 21, a plurality of press-fitting holes 212a into which one ends of the shaft portions 231 of the guide members 23 are press-fitted, and a plurality of insertion holes 212b through which the extending portions 713 of the pressing members 71 are passed are provided. The insertion hole 212b axially penetrates through the bottom portion 212. In the present embodiment, three press-fitting holes 212a and three insertion holes 212b are provided at regular intervals in a circumferential direction of the bottom portion 212. FIG. 2 illustrates two press-fitting holes 212a and one insertion hole 212b among them.

When a current is applied to the electromagnetic coil 60, a magnetic flux is generated in a magnetic path G indicated by a broken line in FIG. 4B, and the plunger 7 is drawn to the inner ring portion 611 so that the inclined surface 70a of the magnetic material core 70 approaches the inclined surface 611c of the inner ring portion 611 of the yoke 61. Hereby, the magnetic material core 70 receives a magnetic force so that a tip end of the extending portion 713 of the pressing member 71 abuts with an axial end surface of the clutch member 5 so as to press the clutch member 5.

The clutch member 5 is placed inside the yoke 61 because an outermost diameter (a diameter of an outermost part) of the clutch member 5 is smaller than an inside diameter (a minimum diameter of the inner ring portion 611) of the yoke 61. Further, as illustrated in FIGS. 3A and 3B, the clutch member 5 integrally includes: a circular plate portion 51 having an annular disk shape and including a plurality of bowl-shaped recessed portions 510 provided on one axial end surface 51a; a meshing portion 52 provided on the other axial end surface 51b of the circular plate portion 51, the other axial end surface 51b being axially opposed to the first side gear 31; and engageable portions 53 having a trapezoidal pillar shape and provided so as to axially project from the one axial end surface 51a of the circular plate portion 51.

The circular plate portion 51 is placed on a radially inner side of the annular recess 210 where the electromagnet 6 is mounted. The one axial end surface 51a of the circular plate portion 51 is axially opposed to the bottom portion 212 of the first case member 21. The engageable portion 53 is partially inserted into the insertion hole 212b provided in the bottom portion 212 of the first case member 21. A plurality of meshing teeth 521 projecting in the axial direction is provided in the meshing portion 52. The plurality of meshing teeth 521 is provided in a part, on the outer peripheral side, of the other axial end surface 51b of the circular plate portion 51, and the axial end surface 51b provided on an inner side relative to the meshing portion 52 is provided as a flat receiver surface that abuts with the return spring 84 so as to receive a biasing force toward the non-connecting position.

The first side gear 31 is configured such that a plurality of meshing teeth 313 meshing with the plurality of meshing teeth 521 of the clutch member 5 is provided in an annular wall portion 312 provided in a projecting manner on the outer peripheral side relative to the gear wheel portion 311.

When the clutch member 5 is pressed by the plunger 7 and moved in the axial direction, the plurality of meshing teeth 521 of the meshing portion 52 meshes with the plurality of meshing teeth 313 of the first side gear 31. That is, when the clutch member 5 moves toward the first side gear 31, the clutch member 5 and the first side gear 31 are connected to each other in a relatively non-rotatable manner by meshing between the plurality of meshing teeth 521, 313.

In the first case member 21, an engaged portion to which the engageable portion 53 of the clutch member 5 circumferentially engages is constituted by the insertion hole 212b. The engageable portion 53 of the clutch member 5 includes an abutting surface 53a that abuts with an inner surface 212c (see FIG. 2) of the insertion hole 212b so as to receive a torque from the first case member 21. The abutting surface 53a is an end surface of the engageable portion 53 in the circumferential direction. The abutting surface 53a of the engageable portion 53 and the inner surface 212c of the insertion hole 212b, with which the abutting surface 53a abuts, are flat surfaces parallel to the rotation axis O. When the clutch member 5 receives a torque from the first case member 21, the abutting surface 53a of the engageable portion 53 makes surface contact with the inner surface 212c of the insertion hole 212b.

Further, the distal surface 53b of the engageable portion 53 is provided as a pressed surface with which the tip end of the extending portion 713 of the pressing member 71 abuts. When a current is applied to the electromagnetic coil 60, the plunger 7 presses the clutch member 5 toward an annular-wall-portion-312 side of the first side gear 31 such that the extending portion 713 of the pressing member 71 abuts with the distal surface 53b of the engageable portion 53.

An inner surface 510a of the bowl-shaped recessed portion 510 is provided as a cam surface to generate an axial cam thrust by a relative rotation with respect to the first case member 21. In other words, in the clutch member 5, a part of an opposed surface (one axial end surface 51a) of the circular plate portion 51 to the bottom portion 212 of the first case member 21 is provided as a cam surface.

As illustrated in FIG. 1, a projection 212d that abuts with the inner surface 510a of the bowl-shaped recessed portion 510 is provided in the bottom portion 212 of the first case member 21 so as to project in the axial direction. In the present embodiment, the projection 212d is constituted by a sphere 24 fixed to the bottom portion 212. The sphere 24 is partially stored in an axial recess 212e provided in the bottom portion 212, so as to be held by the first case member 21. Note that the projection 212d may be provided integrally as a part of the bottom portion 212. Even in this case, it is desirable that a tip end of the projection 212d be spherical.

The insertion hole 212b of the bottom portion 212 has a circumferential width wider than a circumferential width of the engageable portion 53 of the clutch member 5, and the differential case 2 and the clutch member 5 are rotatable relative to each other within a predetermined angle range corresponding to a difference between the circumferential width of the insertion hole 212b and the circumferential width of the engageable portion 53. The inner surface 510a of the bowl-shaped recessed portion 510 is provided in the clutch member 5 over an angle range larger than this predetermined angle range. Hereby, even if the clutch member 5 rotates relative to the differential case 2, the tip end of the projection 212d (the sphere 24) is always stored in the bowl-shaped recessed portion 510 so as to be axially opposed to the inner surface 510a.

The projection 212d of the bottom portion 212 of the first case member 21 and the bowl-shaped recessed portion 510 of the circular plate portion 51 of the clutch member 5 constitute a cam mechanism 12 for generating an axial thrust to separate the clutch member 5 from the bottom portion 212. Referring now to FIG. 5A to 5C, an operation of the cam mechanism 12 will be described below.

FIGS. 5A to 5C are explanatory views schematically illustrating the operation of the cam mechanism 12 with a circumferential section of the clutch member 5, the bottom portion 212 of the first case member 21, and the annular wall portion 312 of the first side gear 31. In FIGS. 5A and 5B, a rotation direction of the first side gear 31 relative to the differential case 2 (the first case member 21) is indicated by an arrow A.

As illustrated in FIG. 5A, the inner surface 510a of the bowl-shaped recessed portion 510 is constituted by a first inclined surface 510b inclined toward one side in a circumferential direction of the clutch member 5, and a second inclined surface 510c inclined toward the other side in the circumferential direction of the clutch member 5. An inclination angle of the first inclined surface 510b to the circumferential direction of the clutch member 5 is the same as an inclination angle of the second inclined surface 510c.

The meshing tooth 521 of the clutch member 5 and the meshing tooth 313 of the first side gear 31 both have a trapezoidal section. A plurality of recessed portions 313a fitted to the meshing teeth 521 of the clutch member 5 is provided each between the meshing teeth 313 adjacent to each other in the circumferential direction. A tooth flank 521a of the meshing tooth 521 of the clutch member 5 and a tooth flank 313b of the meshing tooth 313 of the first side gear 31 are diagonally inclined relative to the circumferential direction of the clutch member 5 and the first side gear 31.

When an inclination angle (a cam angle) of the first inclined surface 510b and the second inclined surface 510c in the bowl-shaped recessed portion 510 of the clutch member 5 is assumed $\alpha$, an inclination angle of the tooth flank 521a of the meshing tooth 521 relative to the circumferential direction of the clutch member 5 is assumed $\beta$, and an inclination angle of the tooth flank 313b of the meshing tooth 313 relative to the circumferential direction of the first side gear 31 is assumed $\gamma$, $\beta=\gamma$ is established, and $\alpha$ is smaller than $\beta$ and $\gamma$. Hereby, when the cam mechanism 12 is operated and the meshing teeth 521 of the clutch member 5 mesh with the meshing teeth 313 of the first side gear 31, a cam thrust of the cam mechanism 12 becomes larger than a meshing reaction force of the meshing teeth 521, 313, so that the clutch member 5 is not pushed back toward the bottom portion 212 of the first case member 21 by the meshing reaction force.

When no current is applied to the electromagnetic coil 60, the clutch member 5 is pressed against the bottom portion 212 of the first case member 21 by a biasing force of the return spring 84. This state is illustrated in FIG. 5A. As illustrated in FIG. 5A, the projection 212d of the bottom portion 212 abuts with a backmost part of the bowl-shaped recessed portion 510, and the meshing teeth 521 of the clutch member 5 do not mesh with the meshing teeth 313 of the first side gear 31. In this state, the differential case 2 is rotatable relative to the first side gear 31, so a torque input into the differential case 2 is distributed while a differential action between the first side gear 31 and the second side gear 32 is allowed.

When a current is supplied to the electromagnetic coil 60, the pressing member 71 of the plunger 7 presses the clutch member 5, and after that, the cam mechanism 12 operates so that the clutch member 5 meshes with the first side gear 31. FIG. 5B illustrates a state at the time when the meshing starts, and FIG. 5C illustrates a state where the meshing is completed.

As illustrated in FIG. 5B, when a current is applied to the electromagnetic coil 60 and the clutch member 5 is pressed by the pressing member 71 of the plunger 7, respective tip ends of the meshing teeth 521 of the clutch member 5 and the meshing teeth 313 of the first side gear 31 mesh with each other. Due to the meshing, the clutch member 5 rotates following the first side gear 31 so as to rotate relative to the differential case 2, so that the projection 212d of the bottom portion 212 slides on the first inclined surface 510b or the second inclined surface 510c of the bowl-shaped recessed portion 510. FIG. 5B illustrates a case where the projection 212d of the bottom portion 212 slides on the first inclined surface 510b of the bowl-shaped recessed portion 510. Due to this sliding, a part with which the projection 212d of the bottom portion 212 abuts gradually moves to a shallow part of the bowl-shaped recessed portion 510, so that the clutch member 5 moves toward the first side gear 31 by a cam thrust. Hereby, a depth of the meshing between the meshing teeth 521 of the clutch member 5 and the meshing teeth 313 of the first side gear 31 (a distance of an axial overlap between the meshing teeth 521, 313) d1 is gradually deepened.

A relative rotation of the clutch member 5 to the differential case 2 is restricted such that the abutting surface 53a of the engageable portion 53 of the clutch member 5 makes contact with the inner surface 212c of the insertion hole 212b in the first case member 21. That is, as illustrated in FIG. 5C, when the abutting surface 53a of the engageable portion 53 of the clutch member 5 abuts with the inner surface 212c of the insertion hole 212b, the relative rotation of the clutch member 5 to the differential case 2 stops, so that the axial movement of the clutch member 5 to the differential case 2 also stops.

At this time, a gap S1 in the axial direction is provided between a bottom face 313c of the recessed portion 313a between the meshing teeth 313 of the first side gear 31 and a distal surface 521b of the meshing tooth 521 of the clutch member 5, as illustrated in FIG. 5C. That is, even if the clutch member 5 rotates relative to the differential case 2, the meshing teeth 521 of the clutch member 5 are not butted against the annular wall portion 312 of the first side gear 31, so that the clutch member 5 does not directly press the first side gear 31 in the axial direction due to the cam thrust of the cam mechanism 12. Further, a gap S2 is also provided between a distal surface 313d of the meshing tooth 313 of the first side gear 31 and the circular plate portion 51 of the clutch member 5.

In a state where the meshing between the meshing teeth 521 of the clutch member 5 and the meshing teeth 313 of the first side gear 31 is completed, the engageable portion 53 of the clutch member 5 engages with the insertion hole 212b of the first case member 21 so that the relative rotation between the differential case 2 and the clutch member 5 is restricted, and due to the meshing between the meshing teeth 521 of the clutch member 5 and the meshing teeth 313 of the first side gear 31, a relative rotation between the clutch member 5 and the first side gear 31 is restricted. Hereby, a relative rotation between the differential case 2 and the first side gear 31 is restricted, and a torque is transmitted from the differential case 2 to the first side gear 31 via the clutch member 5.

As such, when the clutch member 5 moves in a direction to mesh with the first side gear 31, the depth of the meshing with the first side gear 31 is deepened by the cam thrust and then the engageable portion 53 of the clutch member 5 engages with the insertion hole 212b of the first case member 21, so that the clutch member 5 receives a torque from the differential case 2.

Further, a differential action between the differential case 2 and the first side gear 31 is restricted, so that the first pinion gear 41 and the second pinion gear 42 cannot rotate and a differential action between the differential case 2 and the second side gear 32 is also restricted, thereby resulting in that a torque is transmitted to the second side gear 32 from the differential case 2 via the first pinion gear 41 and the second pinion gear 42.

As illustrated in FIG. 5C, when a cam thrust of the cam mechanism 12 is assumed Fc, a pressing force of the plunger 7 due to current application to the electromagnetic coil 60 is assumed Fp, a meshing reaction force between the meshing teeth 521 of the clutch member 5 and the meshing teeth 313 of the first side gear 31 is assumed Fd, and a biasing force of the return spring 84 is assumed Fr, if Fp>Fr is established, it is possible to shift from the state illustrated in FIG. 5A to the state illustrated in FIG. 5B. After that, the meshing between the meshing teeth 521 of the clutch member 5 and the meshing teeth 313 of the first side gear 31 is completed due to the cam thrust Fc of the cam mechanism 12.

When the meshing teeth 521 of the clutch member 5 mesh with the meshing teeth 313 of the first side gear 31, the meshing reaction force Fd is generated, but since the relationship of α<β, γ is established as has been described above, the meshing reaction force Fd is smaller than the cam thrust Fc. A condition to maintain the meshing between the meshing teeth 521 of the clutch member 5 and the meshing teeth 313 of the first side gear 31 is Fd+Fr<Fc+Fp.

Further, when the current application to the electromagnetic coil 60 is stopped, the clutch member 5 returns to the non-connecting position illustrated in FIG. 5A by the meshing reaction force Fd and the biasing force Fr of the return spring 84. A condition for this is Fd+Fr>Fc. That is, the inclination angle α of the first inclined surface 510b and the second inclined surface 510c in the bowl-shaped recessed portion 510 of the clutch member 5, the inclination angle β of the tooth flank 521a of the meshing tooth 521 of the clutch member 5, the inclination angle γ of the tooth flank 313b of the meshing tooth 313 of the first side gear 31, a magnetic force of the electromagnet 6, and a spring constant of the return spring 84 are set so as to satisfy an inequality of Fd+Fr<Fc+Fp and an inequality of Fd+Fr>Fc.

A main operation/working-effect to be provided by the present embodiment described above is as follows.

Since the outermost diameter of the clutch member 5 is smaller than the inside diameter of the yoke 61, the clutch member 5 can be placed inside the yoke 61. That is, the clutch member 5 and the yoke 61 can be placed in a radially overlapping manner, thereby making it possible to axially downsize the differential gear 1.

The meshing teeth 521 of the clutch member 5 are provided in the axial end surface 51a of the circular plate portion 51, the axial end surface 51a being opposed to the first side gear 31 in the axial direction, and the meshing teeth 313 of the first side gear 31 are provided in the annular wall portion 312 opposed to the axial end surface 51a of the clutch member 5, thereby making it possible to decrease axial dimensions of the meshing teeth 521, 313.

The magnetic material core 70 of the plunger 7 is placed inside the yoke 61, an end portion of the inner ring portion 611 of the yoke 61 on a discontinuous-portion-611a side is axially opposed to the magnetic material core 70, and the plunger 7 moves axially at the time when a current is applied to the electromagnetic coil 60. This makes it possible to configure the pressing mechanism 11 in a simple manner, thereby making it possible to downsize the differential gear 1. Further, since the yoke 61 has a magnetic permeability higher than the first case member 21, the magnetic flux generated by current application to the electromagnetic coil 60 does not flow through the first case member 21 substantially, thereby making it possible to stabilize a magnetic resistance of the magnetic path G. That is, a magnetic resistance of the first case member 21 is not necessarily uniform due to constitutional variations in a steel material, and the like. However, the magnetic resistance can be stabilized by causing the magnetic flux to substantially flow only in the yoke 61 and the magnetic material core 70, thereby making it possible to highly precisely adjust a pressing force of the plunger 7 to the clutch member 5.

Since the plunger 7 is configured such that the pressing member 71 for pressing the clutch member 5 is made of a nonmagnetic material, it is possible to restrain the magnetic flux from leaking out from the magnetic material core 70 to the first case member 21. Further, the plunger 7 is guided by the guide members 23 made of a nonmagnetic material so as to axially move with respect to the differential case 2. With this configuration, it is also possible to restrain the magnetic flux from leaking out from the magnetic material core 70 to the first case member 21.

The present invention has been described with reference to the above embodiment, but the present invention is not limited to this embodiment, and various modifications can be made appropriately within a range which does not deviate from the gist of the present invention. For example, the above embodiment deals with a case where the present invention is applied to a parallel-axis differential gear in which respective rotation axes of a pair of side gears (the first side gear 31 and the second side gear 32) and a pair of pinion gears (the first pinion gear 41 and the second pinion gear 42) are parallel to each other. However, the present invention is not limited to this, and the present invention is also applicable to a differential gear configured such that a pair of side gears and a pair of pinion gears mesh with each other with their gear axes being at right angles.

What is claimed is:

1. A differential gear comprising:
   a first output gear;
   a second output gear placed rotatable relative to the first output gear around a common rotation axis;
   a differential case configured to store the first output gear and the second output gear;
   a clutch member configured to move in a direction of the rotation axis between a connecting position where the differential case is connected to the first output gear in a relatively non-rotatable manner and a non-connecting position where the differential case and the first output gear are allowed to rotate relative to each other, wherein the clutch member has an engaging portion engaging the first output gear to connect the differential case to the first output gear when the clutch member is in the connecting position;
   an electromagnetic coil having a cylindrical shape and configured to move the clutch member in the direction of the rotation axis by a magnetic force generated by current application; and
   a yoke having an annular shape and serving as a magnetic path of a magnetic flux of the electromagnetic coil, wherein
   the clutch member has an outermost diameter smaller than an inside diameter of the yoke, and
   wherein the clutch member and the yoke radially overlap one another such that a line extending perpendicular to the rotation axis and intersecting the engaging portion of the clutch member in the non-connecting position also intersects the yoke.

2. The differential gear according to claim 1, wherein:
   the engaging portion of the clutch member comprises a plurality of teeth, such that when the clutch member moves toward the first output gear, the clutch member and the first output gear are connected to each other in the relatively non-rotatable manner by meshing between the plurality of teeth of the clutch member and a plurality of teeth of the first output gear;
   the plurality of meshing teeth of the clutch member is provided in an axial end surface opposed to the first output gear in the direction of the rotation axis; and
   the plurality of meshing teeth of the first output gear is provided in an annular wall portion opposed to the axial end surface of the clutch member.

3. The differential gear according to claim 1, further comprising a plunger configured to move in the direction of the rotation axis upon receiving the magnetic force so as to press the clutch member, wherein:

the yoke includes an inner ring portion opposed to an inner peripheral surface of the electromagnetic coil, an outer ring portion opposed to an outer peripheral surface of the electromagnetic coil, and a pair of axial end portions opposed to respective axial end surfaces of the electromagnetic coil;

a discontinuous portion where the magnetic path is discontinued is provided in the inner ring portion along a circumferential direction;

at least one end portion out of both axial end portions of the yoke across the discontinuous portion is opposed to the plunger in the direction of the rotation axis; and when a current is applied to the electromagnetic coil, the plunger is drawn toward the at least one end portion of the yoke.

4. The differential gear according to claim 3, wherein:

the plunger includes an annular magnetic material core made of a soft magnetic material, and a pressing member made of a nonmagnetic material and configured to move in an axial direction integrally with the annular magnetic material core so as to press the clutch member; and the annular magnetic material core receives the magnetic force.

5. The differential gear according to claim 3, wherein the plunger is guided by a columnar member so as to be movable with respect to the differential case, the columnar member extending from the differential case in the direction of the rotation axis and made of a nonmagnetic material.

6. The differential gear according to claim 5, wherein:

an insertion hole extending in the direction of the rotation axis is provided in the plunger; and the columnar member includes a shaft portion having an outside diameter smaller than an inside diameter of the insertion hole and inserted into the insertion hole, and a falling-off prevention portion configured to abut with an end portion of the plunger on an opposite side to the clutch member so as to prevent the plunger from falling off.

7. The differential gear according to claim 1, wherein the first output gear and the yoke radially overlap one another such that a line extending perpendicular to the rotation axis and intersecting a portion of the first output gear also intersects the yoke.

* * * * *